(12) United States Patent
Alazma et al.

(10) Patent No.: US 6,173,175 B1
(45) Date of Patent: Jan. 9, 2001

(54) PROCESS FOR PROVISIONING RESOURCES IN A RADIOTELEPHONE NETWORK

(75) Inventors: Manar Alazma, Dallas; Eddy H. Trink, Plano; Ping Yang, Plano; Kalyan Basu, Plano, all of TX (US)

(73) Assignee: Nortel Networks Limited, Montreal (CA)

( * ) Notice: Under 35 U.S.C. 154(b), the term of this patent shall be extended for 0 days.

(21) Appl. No.: 08/955,201

(22) Filed: Oct. 21, 1997

(51) Int. Cl.[7] .................................................. H04Q 7/20
(52) U.S. Cl. .................... 455/423; 455/422; 455/446; 455/450; 455/452
(58) Field of Search .................. 455/446, 447, 455/448, 422, 423, 424, 509, 450, 452, 528, 62

(56) References Cited

U.S. PATENT DOCUMENTS

| | | | |
|---|---|---|---|
| 5,442,804 | * | 8/1995 | Gunmar et al. ................. 455/446 |
| 5,664,006 | * | 9/1997 | Monte et al. ................... 455/456 X |
| 5,713,075 | * | 1/1998 | Threadgill et al. .............. 455/427 |
| 5,870,385 | * | 2/1999 | Ahmadi et al. ................. 455/447 X |

OTHER PUBLICATIONS

Alazma, Manar, et al., *DMS–MTX System Resource/Office Parameter Engineering: Provisioning Rules for the MSC and Standalone HLR*, Nortel Networks, Department 2S13—Wireless System Architecture, Wireless Systems Engineering, Oct. 2, 1998.

\* cited by examiner

*Primary Examiner*—Daniel S. Hunter
*Assistant Examiner*—Yemane Woldetatios
(74) *Attorney, Agent, or Firm*—John D. Crane

(57) ABSTRACT

The provisioning process of the present invention first determines the average number of units of the system resource that are held per call. This parameter is a function of the call model and call-related event holding times. The average number of units is used, along with the Busy Hour Call Attempts to determine the holding rate, $R_{resource}$, of that particular call-related event to be allocated memory. The holding rate is then used by $\lceil R_{resource} + 7\sqrt{R_{resource}} \rceil$ to determine the number of resources required to be allocated to the call-related event.

17 Claims, 2 Drawing Sheets

| SYSTEM RESOURCE | ACTUAL EVENT/SEC | OVER-SHOOT RISK-CORRECTION FACTOR |
|---|---|---|
| SWITCH EXTENSION BLOCKS | 17.74 | LOW – 25% |
| CALL CONDENSE BLOCKS | 44.9 | LOW – 25% |
| MEMORY DATA BLOCKS | 0.30 | HIGH – 100% |
| HAND-OFF BLOCK COUNT | 21.15 | MEDIUM – 50% |
| LARGE FEATURE DATA BLOCKS | 8.03 | HIGH – 100% |
| MEDIUM FEATURE DATA BLOCKS | 4.63 | HIGH – 100% |
| SMALL FEATURE DATA BLOCKS | 0.018 | HIGH – 100% |

PROCESS FOR PROVISIONING RESOURCES IN A RADIOTELEPHONE NETWORK

BACKGROUND OF THE INVENTION

I. Field of the Invention

The present invention relates to radio communications. More particularly, the present invention relates to provisioning resources in a radiotelephone network.

II. Description of the Related Art

Cellular radiotelephone networks provide mobile radiotelephone subscribers access to the land-line public switched telephone network (PSTN). FIG. 1 illustrates a typical prior art example of such a radiotelephone network.

This network is comprised of a number of base stations (104–109) that use multiple radio transceivers to communicate with the mobile subscriber (130). The base stations are controlled by base station controllers (101–103) that are coupled to a central switch (100), referred to in the art as the mobile switching center (MSC).

The MSC (100) is a point of access to the PSTN (120). The MSC (100) supervises and controls connections between the PSTN (120) and mobile subscribers (130). Any combination of calls are made possible by the MSC (100): land-to-land, mobile-to-land, land-to-mobile, or mobile-to-mobile. The MSC (100) is well known in the art and is therefore not described further.

This network and its elements are generic to multiple types of radiotelephone systems such as the advanced mobile phone system (AMPS), Global System for Mobile communications (GSM) time division multiple access (TDMA), and code division multiple access (CDMA). These standards are described in greater detail in their respective specifications available from the Electronic Industries Association/Telecommunications Industry Association (EIA/TIA).

In addition to functioning as the interface to the public land-line network, the above described switch also controls all of the subsystems required for the cellular system. These subsystems include radio channel units, cell site equipment, mobile subscriber billing, and system operational measurement software that are responsible for determining the operational measurements of the switch.

Operational measurements, as is well known in the cellular art, are counters for the events that occur in a cellular switch. These call-related events include, for example, the activity that takes place within the switch such as mobile-to-land calls, mobile-to-mobile calls, land-to-mobile calls, hand-offs, three-way calls, and dropped calls. Different systems have various operational measurements depending on the system requirements and features offered by the system operator.

The radiotelephone systems have various resources that must be allocated to the radiotelephone subscribers. These resources include system memory and radios. The resources are allocated by estimating the resources required when certain call features (call forwarding, conference calling, etc.) are in use by the system operator. The estimation technique's drawback is that the amount of resources can be under or overestimated.

Underestimating the required resources will cause service degradation and possibly a system reset since not enough memory is set aside for the traffic. Overestimating causes greater expense for the system operator due to the high cost of memory and other hardware.

SUMMARY OF THE INVENTION

The provisioning process of the present invention more accurately estimates the provisioning of system resources, thus increasing system reliability and reducing the operator's cost. The process allocates a system resource in a radiotelephone system. The radiotelephone system accumulates operational measurements, handles calls, and has call related features.

The provisioning process determines an average number of system resources required per call-related event. This average is used to determine the holding rate of the system resource, $R_{resource}$, by taking into account the busy hour call attempts and the ratio of the high day busy hour to average busy season busy hour.

Using the holding rate, the number of system resources to be allocated is found using resource = $\lceil R_{resource} + 7\sqrt{R_{resource}} \rceil$. This estimate may then be adjusted to take into account roaming radiotelephones accessing the system. This adjustment is based on the probability of the estimated allocation of each resource being exceeded.

DETAILED DESCRIPTION OF THE PREFERRED EMBODIMENT

The provisioning process of the present invention more accurately estimates the provisioning of system resources. This minimizes system outages and service degradation caused by the unavailability of the system resources. The present invention additionally provides a notification to the system operator thus allowing the system resources to be updated in a timely manner.

In the preferred embodiment, the system resources being provisioned are blocks of the system memory. Alternate embodiments use the present invention to provision other system resources such as radios.

Figure 1:
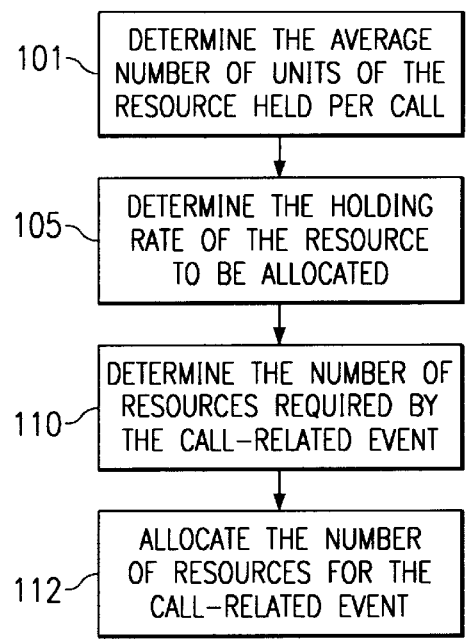
FIG. 1 shows a flowchart for the provisioning process of the present invention.

FIG. 1 illustrates a flowchart for the provisioning process of the present invention. This flowchart is the general provisioning rule that is used in each of the subsequently described memory allocations for each system resource.

The general provisioning process determines the average number of units of the resource held per call event (step 101), in units of time. This parameter is subsequently referred to as $X_{resource}$. Finding $X_{resource}$ uses the call model frequency for the resource to be allocated, the average hold time for the call-related events, and the number of resource instances required for the call-related event.

The call model frequencies are derived from the operational measurements as explained above. These call model frequencies are data counted by the switch in response to call activity. In the preferred embodiment, unless stated otherwise, these models are expressed as a percentage of the total calls handled by the switch.

The average hold time of the call-related event is the average duration, in seconds, of each event. This hold time is referred to in the art as the call hold time (CHT). These values are different for different systems. Therefore, each system assumes certain CHT values for the various call-related events. The CHT values used in the subsequent discussion are typical but the invention is not limited to these values.

The number of resource instances required for the call-related event refers to the number of times that a call-related resource is needed. For example, a hand-off may require two memory blocks each time that call-related event occurs. This parameter is determined by past experience in the system over a period of time.

The process then determines $R_{resource}$, the holding rate of the resource under consideration (step 105). $R_{resource}$ is found from the equation:

$$R_{resource} = \frac{(1.5 \cdot BHCA) \cdot X_{resource}}{3600}$$

in Erlang,
where BHCA is the Busy Hour Call Attempts in hours.

$R_{resource}$ is found using the assumption that the ratio of the High Day Busy Hour (HDBH) to the Average Busy Season Busy Hour (ABSBH) is 1.5. ABSBH is the average value of the Busy Hour Call Attempts over a season. The duration of a season is determined by the operator. HDBH is the peak value of the Busy Hour Call Attempts during a season.

Since the BHCA has units of hours, this needs to be changed to seconds. Therefore, the BHCA is divided by 3600 seconds. The number of Busy Hour Call Attempts can be computed as follows:

$$BHCA = \frac{CPOCC * (3.60 \times 10^6)}{AWT}$$

where CPOCC is the time that the call processor is occupied with call processing tasks and is set at the engineering limit of 0.75 in the preferred embodiment, assuming the call processor is occupied 75% of the time doing call processing tasks. Alternate embodiments use other constants for CPOCC depending on the amount of time the call processor is performing call processing tasks.

AWT is the average work time, typically in milliseconds, so that the 3.60 ×10⁶ converts the milliseconds to hours. AWT is determined using the frequency of call events, the call processing time, the call processing I/O time, and any other I/O time. This weighted average is computed using the following equation:

$$AWT = \Sigma(F_E * CP_E) + (F_E * CPIO_E) + I/O$$

where $F_E$ is the frequency of a particular event, $CP_E$ is the call processing time for that event, $CPIO_E$ is the timing for the call processing I/O, and I/O is the timing for the remaining I/O of the switch that is not related to call processing. This remaining I/O is a constant, 0.25 in the preferred embodiment, times the number of messages in a set of events. This summation is performed on all of the different events handled by the switch. BHCA, CPOCC, and AWT are all well known in the art and are not discussed further.

The number of resources required (step 110) is determined by assuming that the traffic in a telecommunication system typically follows the Poisson distribution. The provisioning rule of the present invention relies on the Erlang Loss Formula:

$$E(n, r) = \frac{\frac{r^n}{n!}}{\sum_{i=1}^{n} \frac{r^i}{i!}}$$

where n is the number of instances of the required system resource and r is the ratio of ordered traffic and the average holding rate of the parameter. The value given by the Erlang Loss Formula is sometimes referred to as the "Grade of Service" but more accurately represents the portion of failed call requests. If the tolerable Grade of Service is known, the Erlang Loss Formula can be used to derive the number of required parameters.

The provisioning of traffic related parameters involves choosing a reasonable Grade of Service and then determining the number of required resources. This is accomplished more efficiently by reorganizing the Erlang Loss Formula as follows:

$$E(n, r) = \frac{\frac{r^i}{n!}e^{-r}}{\sum_{i=0}^{n} \frac{r^i}{i!}e^{-r}} \quad \text{and}$$

$$E(n, r) = \frac{P(n, r)}{\sum_{i=0}^{n} P(i, r)}$$

where P(n,r) is a Poisson distribution with mean r. P(n,r) is given by:

$$P(n, r) = \frac{r^n}{n!}e^{-r}.$$

By the Central Limit Theorem, when r is large enough, the Gaussian distribution can be used to approximate the Poisson distribution. Therefore, the equation for P can be approximated by:

$$G(n, r) = \frac{1}{\sqrt{2\pi}}e^{-\left(\frac{(n-r)^2}{2r}\right)}.$$

The Erlang formula can therefore be approximated by:

$$E'(n, r) = \frac{\frac{1}{\sqrt{2\pi}}e^{-\left(\frac{(n-r)^2}{2r}\right)}}{\sum_{i=0}^{n} \frac{1}{\sqrt{2\pi}}e^{-\left(\frac{(i-r)^2}{2r}\right)}}.$$

Since a large r is assumed, the Erlang formula can be further simplified:

$$G'(n, r) = \frac{\frac{1}{\sqrt{2\pi}} e^{-\left(\frac{(n-r)^2}{2r}\right)}}{\frac{1}{\sqrt{2\pi}} \left( \int_{-\infty}^{n} e^{-\left(\frac{(x-r)^2}{2r}\right)} dx \right)}.$$

When n is large:

$$\frac{1}{\sqrt{2\pi}} \left( \int_{-\infty}^{n} e^{-\left(\frac{(x-r)^2}{2r}\right)} dx \right) = 1.$$

Figure 2:
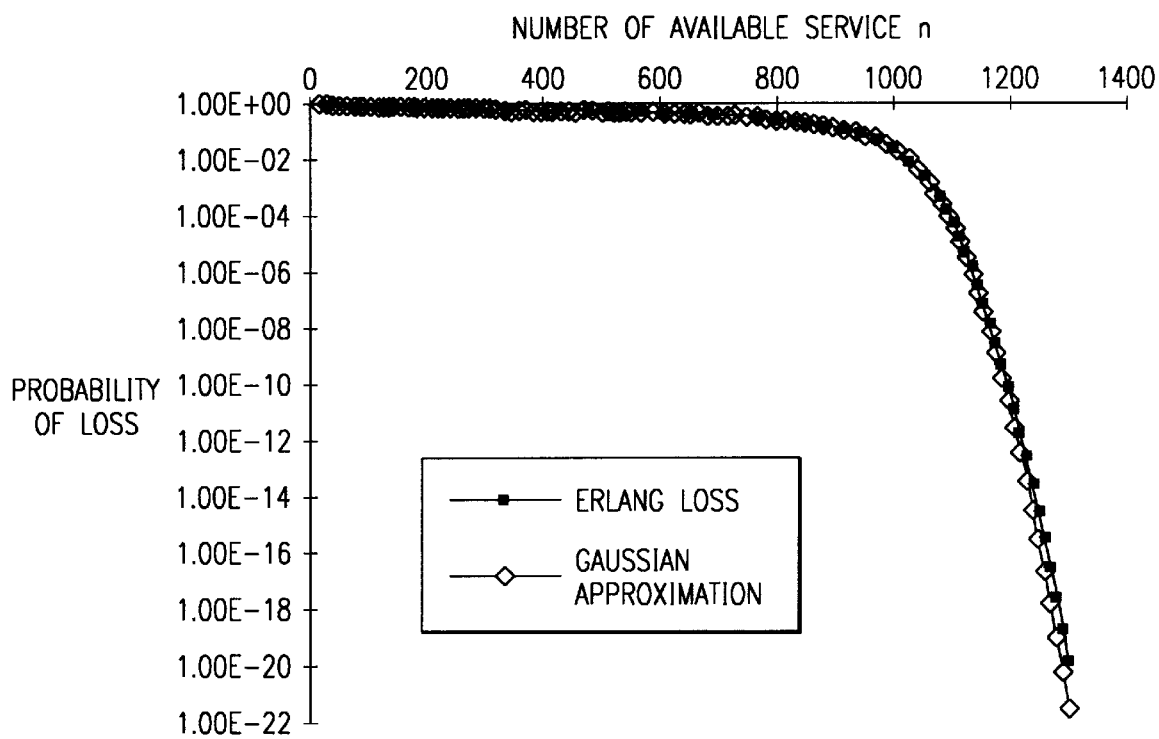
FIG. 2 shows a comparison of Erlang-B formula and a Gaussian Approximation.

FIG. 2 illustrates a plot of (n), the number of instances of the required resource, versus the probability of loss. This plot shows a comparison of the Erlang Loss Formula (Erlang-B) and the Gaussian approximation, with r=1000. The two plots are so close, it is obvious that the Gaussian distribution above can be used to approximate the Erlang Loss Formula.

A Gaussian value can be determined by:

$$n = \lceil r + a\sqrt{r} \rceil,$$

where $\alpha=1, 2, 3, \ldots$, and $\lceil x \rceil$ denotes the smallest integer that is greater than x. By choosing different values for $\alpha$, where a is a constant used for the approximation, the desired Gaussian value is obtained. The Erlang Loss values, obtained by the equation for n above, are plotted in FIG. 3 with each line representing a different $\alpha$.

Figures 3, 4:
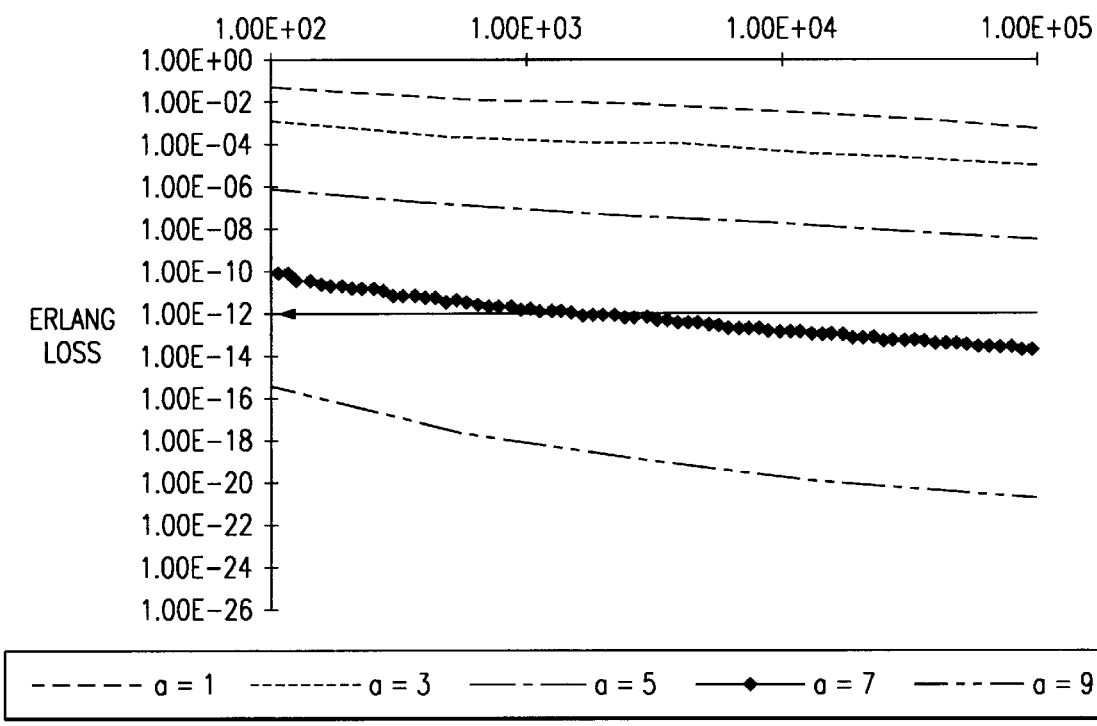
FIG. 3 shows an Erlang Loss versus Erlang Loss(r,n) plot.
FIG. 4 shows a table of risk margin assessments and the new resource estimates for resources allocated by the provisioning process of the present invention.

FIG. 3 shows that by choosing $\alpha=7$, the value of n derived through the above equation gives a probability of loss of less than $10^{-10}$. Therefore, the constant $\alpha=7$ is used for the subsequent provisioning of various resources.

The equation for determining the number of resources required then becomes:

$$\text{resourse} = \lceil R_{resource} + 7\sqrt{R_{resource}} \rceil.$$

For each of the subsequent discussions on the different resources being provisioned, the $R_{resource}$ equation above is used to determine the holding rate for each resource. This is then substituted into the above resource equation to determine the number of instances of the resource required.

The SEB parameter defines the number of switch extension blocks of memory available for use by calls on the switch. SEB parameters are associated with every type of call and are held for the duration of the call. The duration of the call is known in the art as the average call hold time (CHT). The SEB parameter is defined as follows:

$$X_{SEB} = (1) \cdot CHT,$$

$$R_{SEB} = \frac{1.5 \cdot BHCA \cdot X_{SEB}}{3600},$$

and $$SEB = \lceil R_{SEB} + 7\sqrt{R_{SEB}} \rceil.$$

The number of call condense blocks (CCB) is a parameter that is required for all switch units. A call condense block is a portion of memory that is associated with a call throughout it duration. This resource contains information such as the identity of the calling and called parties. The parameter determines the maximum number of simultaneous calls. The number of CCBs is determined by the following:

$$X_{CCB} = (1) \cdot CHT,$$

$$R_{CCB} = \frac{1.5 \cdot BHCA \cdot X_{CCB}}{3600},$$

and $$CCB = \lceil R_{CCB} + 7\sqrt{R_{CCB}} \rceil.$$

The parameter that determines the number of memory data blocks allocated to a call is referred to as MDB. This block of memory is related to the number of simultaneous inter-system hand-offs occurring. MDBs are seized once an inter-system hand-off takes place and is held for the duration of the call or until the roaming radiotelephone returns to its home switch (i.e., does an inter-system hand-off back to its originating switch).

The MDBs are determined by the total of the percentage of inter-system hand-off incoming calls (IHIC) and the percentage of inter-system hand-off outgoing calls (IHOG). The MDBs are provisioned as follows:

$$X_{MDB} = (IHIC+IHOG) \cdot CHT,$$

$$R_{MDB} = \frac{1.5 \cdot BHCA \cdot X_{MDB}}{3600},$$

and $$MDB = \lceil R_{MDB} + 7\sqrt{R_{MDB}} \rceil.$$

The hand-off block count (HOB) parameter defines the number of hand-off data blocks to be allocated. One hand-off block is allocated for every hand-off attempt in progress. The holding times of HOBs vary depending on whether the HOB is being used for an intra-system hand-off (HHT) or inter-system hand-off (IHHT). In the preferred embodiment, the hand-off holding time is six seconds and the inter-system hand-off holding time is 20 seconds. The HOB parameter is provisioned as follows:

$$X_{HOB} = (HO+HONORESP) \cdot HHT + (IHIC+IHOG) \cdot IHHT,$$

$$X_{HOB} = (HO+HONORESP) \cdot 6 + (IHIC+IHOG) \cdot 20$$

$$R_{HOB} = \frac{1.5 \cdot BHCA \cdot X_{HOB}}{3600},$$

and $$HOB = \lceil R_{HOB} + 7\sqrt{R_{HOB}} \rceil.$$

Feature data blocks (FDB) are associated with different call related features such as call forwarding (CFW), call waiting (CWT), three way calling (3WC), surveillance (SRV), cellular extension phone (CEP), call forward do not answer (CFD), and treatments (TRMT). In the preferred embodiment, these memory blocks are comprised of different sizes: large, medium, and small. The different sizes exist in order to achieve data store efficiency. The holding time for each FDB varies with the length of time that the feature is used. As in above resources, the designations CFW, CWT, 3WC, CFD, CEP, and SRV represent the percentage of calls using that particular feature.

The large feature data blocks are used by call forwarding, call forward do not answer, call surveillance, and cellular extension phone (group ringing). These resources are determined by:

$$X_{FDB-LG}=(CFW+CFD+CEP+SRV)\cdot CHT+(ALCEP-1)\cdot CEP\cdot PRHT,$$

where PRHT is the page response holding time, CHT is the call holding time, and ALCEP is the average number of legs per CEP call The page response holding time is the length of time required for the first radiotelephone to respond to a page. In the preferred embodiment, this time is set at six seconds. Alternate embodiments use other lengths of time for this holding time. The above equation for XFDB-LG then becomes:

$$X_{FDB-LG}=(CFW+CFD+CEP+SRV)\cdot CHT+(ALCEP-1)\cdot CEP\cdot 6.$$

Substituting $X_{FDB-LG}$ into the $R_{resource}$ equation above yields:

$$R_{FDB-LG} = \frac{1.5 \cdot BHCA \cdot X_{FDB-LG}}{3600}.$$

Therefore, the number of large feature data blocks to be provisioned is determined by:

$$FDB_{LG}=\lceil R_{FDB-LG}+7\sqrt{R_{FDB-LG}}\rceil.$$

Medium feature data blocks are used by the features call waiting, three-way calling, and call treatments. These resources are provisioned similar to the large feature data blocks:

$$X_{FDB-MED}=(LEGS_{CWT}+LEGS_{3WC}\cdot 3WC+TRMT)\cdot CHT,$$

$$X_{FDB-MED}=(2\cdot CWT+3\cdot 3WC+TRMT)\cdot CHT,$$

$$R_{FDB-MED} = \frac{1.5 \cdot BHCA \cdot X_{FDB-MED}}{3600},$$

and thus, $$FDB_{MED}=\lceil R_{FDB-MED}+7\sqrt{R_{FDB-MED}}\rceil.$$

Two medium feature data blocks are required when the call waiting feature is invoked. One medium feature data block is needed for each leg of the call. Similarly, when three-way calling is used, when all three parties are bridged, a medium feature data block is required for each leg of the three-way all.

The small FDB parameter is associated with features such as call forward and call forward do not answer. Assuming that call forward is always deactivated once it is activated, two small feature data blocks are required for each use of the CFW feature. The provisioning of this resource is similar to the large and medium equations above and is not repeated.

The above described provisioning of memory blocks represents the use of the general provisioning process of the present invention. Any system resource can be provisioned in a similar way in other embodiments.

A system operator may additionally choose to provide a buffer of memory blocks beyond those calculated by the general provisioning process.

This provides a safety margin to guard against a large number of roaming callers entering the system and using system resources, a large number of home subscribers registering for an unforeseen event, or other anomalous events.

The risk of a traffic increase was determined by examining the resource usage and understanding the likelihood of usage spike occurring on that resource. Resources that are used for each call will most likely have a low probability of over-shoot risk because they are already being used at a near capacity level. Those resources that are rarely used, such as the ones associated with specific features, have a higher likelihood of experiencing a usage spike.

The table of FIG. 4 shows examples of the outcome of the risk margin assessment and the new resource estimates for resources examined above. This table is only an example and will vary between systems due to varying resource usage and varying roaming callers for each system.

This table shows the system resource in the left column. The actual number of seconds per event for each resource is in the next column. The over-shoot risk determined for a particular system is then listed in the next column along with the correction factor to be applied to the result of the general provisioning process of the present invention.

In the preferred embodiment, the above provisioning information is provided to the system operator for implementation. The system operator then manually allocates the amount of memory for each call-related event or feature.

However, an alternate embodiment determines the amount of memory to be allocated for each call-related event and automatically reallocates the required resource without operator intervention. This is accomplished by feeding the number of instances of the required system resource into a system processor that then reallocates the resource accordingly.

We claim:

1. A method for allocating system resources in a radiotelephone system, the radiotelephone system providing operational measurements, handling calls, and having call related features, the method comprising the steps of:

determining an average number of system resources required per call-related event;

determining a holding rate based on the average number of system resources required per call-related event and Busy Hour Call Attempts ("BHCA");

estimating a number of system resources needed based on the holding rate of the system resource; and allocating the estimated number of system resources for each call-related event or feature, wherein the allocation of the system resource increases system reliability and reducing operation costs.

2. The method of claim 1 wherein the step of determining the average number of system resources includes the steps of:

generating a call model frequency in response to the operational measurements; and determining an average holding time for the system resources relating to the call model.

3. The method of claim 1 wherein the step of determining the average number of system resources includes the step of determining a number of times that a call-related event is required.

4. The method of claim 1 wherein the step of determining the holding rate includes determining a ratio of High Day Busy Hour to Average Busy Season Busy Hour.

5. The method of claim 4 wherein the ratio is 1.5.

6. A method for allocating at least one system resource in a radiotelephone system, the radiotelephone system providing operational measurements, handling calls, and having call related features, the method comprising the steps of:

determining an average number of system resources required per call-related event;

determining a holding rate of the system resource, $R_{resource}$, based on the average number of system resources required per call-related event and Busy Hour Call Attempts ("BHCA");

estimating a number of system resources required by $\lceil R_{resouce}+7\sqrt{R_{resource}} \rceil$; and allocating the estimated system resources for each call-related event or feature.

7. The method of claim 6 wherein the step of determining the average number of system resources includes the steps of:

generating a call model frequency in response to the operational measurements; and determining an average holding time for the operational measurements relating to the call model.

8. The method of claim 6 wherein the step of determining the average number of system resources includes the step of determining a number of times that a call-related event is required.

9. The method of claim 6 wherein the step of determining the holding rate includes determining a ratio of High Day Busy Hour to Average Busy Season Busy Hour.

10. The method of claim 9 wherein the ratio is 1.5.

11. A method for allocating at least one system resource in a radiotelephone system, the radiotelephone system providing operational measurements, handling calls, and having call related features, the method comprising the steps of:

determining an average number of system resources required per call-related event;

determining a holding rate of the system resource, $R_{resource}$, by $((1.5 \cdot BHCA \cdot X_{resource})/3600)$; and estimating a number of system resources required by $\lceil R_{resouce}+7\sqrt{R_{resource}} \rceil$; and allocating the estimated system resources for each call-related event or feature.

12. A method for allocating at least one system resource in a radiotelephone system, the radiotelephone system providing operational measurements, handling calls, and having call related features, the method comprising the steps of:

generating a call model frequency in response to the operational measurements;

determining an average holding time for the system resources relating to the call model frequency;

determining a number of times that a call-related event is required;

determining an average number of system resources required per call-related event in response to the call model frequency, the average holding time, and the number of times the call-related event is required;

determining a holding rate of the system resource, $R_{resource}$, by $((1.5 \cdot BHCA \cdot X_{resource})/3600)$; estimating a number of system resources required by $\lceil R_{resource}+7\sqrt{R_{resource}} \rceil$; and allocating the estimated system resource for each call-related event or feature.

13. The method of claim 1 wherein the system resource includes one or more memory blocks.

14. The method of claim 13 wherein the step of allocating includes providing a buffer of memory blocks in addition to the estimated memory blocks.

15. The method of claim 6 wherein the system resource includes one or more memory blocks.

16. The method of claim 11 wherein the system resource includes one or more memory blocks.

17. A method for provisioning system memory blocks and associated hardware in a radiotelephone system, the radiotelephone system providing operational measurements, handling calls, and having call related features, the method comprising the steps of:

determining an average number of the memory blocks required per call-related event;

determining a holding rate of the memory blocks, $R_{resource}$, by $((1.5 \cdot BHCA \cdot X_{recource})/3600)$;

estimating a number of the memory blocks required by $\lceil R_{resource}+7\sqrt{R_{resource}} \rceil$; and allocating the estimated number of memory blocks and associated hardware for each call-related event, wherein the allocation of the memory blocks increases system reliability and reducing operation costs.

* * * * *